March 25, 1924.

W. P. HAMMOND ET AL

INFLATION DEVICE

Original Filed April 29, 1910

1,487,851

WITNESSES:
René Bruine
Gustave R. Thompson

INVENTORS
William P. Hammond
and Theodore N. Hammond
By Attorneys
Fraser Turk & Myers Patented Mar. 25, 1924.

1,487,851

UNITED STATES PATENT OFFICE.

WILLIAM P. HAMMOND, OF PASSAIC, AND THEODORE A. HAMMOND, OF RUTHERFORD, NEW JERSEY, ASSIGNORS TO A. SCHRADER'S SON, INC., OF BROOKLYN, NEW YORK, A CORPORATION OF NEW YORK.

INFLATION DEVICE.

Original application filed April 29, 1910, Serial No. 558,413. Patent No. 1,181,133, dated May 2, 1916. Divided and this application filed March 15, 1916. Serial No. 84,276. Renewed June 9, 1922. Serial No. 567,193.

*To all whom it may concern:*

Be it known that we, WILLIAM P. HAMMOND and THEODORE A. HAMMOND, citizens of the United States of America, residing in Passaic, in the county of Passaic and State of New Jersey, and Rutherford, in the county of Bergen and State of New Jersey, respectively, have invented certain new and useful Improvements in Inflation Devices, of which the following is a specification.

This invention relates to new and useful improvements in couplings, and more particularly to couplings intended to be used in connection with pneumatic tires and pressure gauges for tires. The invention furthermore relates to a combination including the novel coupling.

The present application is a division of our application Serial No. 558,413, filed April 29, 1910 now Patent 1,181,133 patented May 2, 1916.

The present device provides a combination, and a coupling, whereby the operations of inflating the tire, and deflating the tire, as for instance in the case of excess pressure, may be readily carried out, and whereby a gauge may be united in such manner that a visual indication of the pressure in the tire may be had during the inflating and deflating.

Other features of improvement will be hereinafter referred to.

An embodiment of the invention is illustrated in the drawings. In said drawings,—

In said drawings, A designates the coupling device per se. The coupling A has a part $a^1$ provided with a passage $a^2$. The part $a^1$ is adapted to be connected with a pneumatic tire, or other container, and is preferably provided with a coupling sleeve $a^3$ adapted to engage the screw-threaded end of a valve casing B. The part $a^1$ of the coupling is also preferably provided with a deflator $a^4$ for depressing the stem of the tire valve when the coupling is connected to the valve casing.

The coupling A also comprises a part $a^5$ having a passage $a^6$ therein. The part $a^5$ is preferably provided with a suitable stop or valve $a^7$ adapted to be operated to open and close the passage therein. The stop or valve is preferably in the form of an ordinary tire valve having a valve stem which may be depressed to unseat the valve, and thereby permit air to pass. The coupling A also comprises a part $a^{10}$ having a passage $a^{11}$ therein. The coupling A also comprises another part $a^{15}$ having a passage $a^{16}$ therein. A pressure gauge C, of any suitable construction, and a tube D leading to a pump or other means adapted to supply air to inflate the tire, are connected, one to one, and the other to the other, of the parts $a^{10}$ and $a^{15}$ of the coupling A. One or both of the parts $a^{10}$ and $a^{15}$ may be provided with suitable valves or stop devices $a^7$. These valves are preferably in the form of an ordinary tire valve having a stem adapted to be depressed to unseat the valve and permit the passage of air. The pressure gauge C may be provided with a deflator $c^1$ to depress a valve stem, where the part of the coupling to which it is connected is provided with a valve. Where the part of the coupling to which the pipe D is connected is provided with a valve, the pipe D may be provided with a part $d^1$ adapted to depress a valve stem.

The pipe D and the gauge C may be attached in a permanent manner to the coupling, but are preferably detachably connected, as shown.

Figure 2:
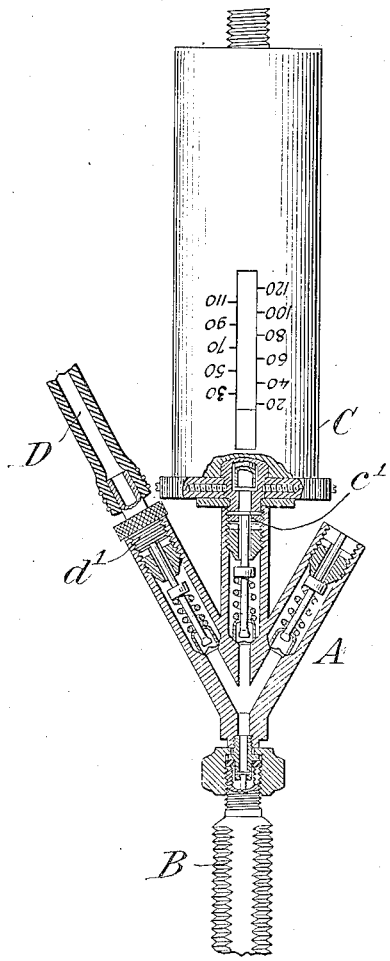
Fig. 2 illustrates the coupling in combination with a pressure gauge and a tube connected with an inflating device, and joined to the valve casing of a pneumatic tire.
Figure 1:
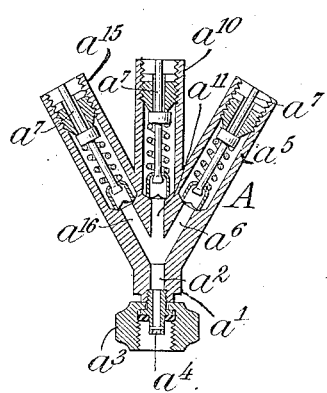
Figure 1 illustrates a vertical sectional view of the coupling.

Operation.—The coupling being attached to a valve casing, and an inflating tube and a gauge attached to the coupling, as shown in Fig. 2, air may be admitted through the tube D to the tire. The pressure of the air in the tire will be indicated by the gauge C. If the tire be inflated to an excessive degree, or if for other reason it be desirable to deflate the tire, the valve in the part $a^6$ may be opened, as by depressing the valve stem to unseat the valve, and air will pass from the tire to the open.

The invention may find expression in other forms and embodiments.

What is claimed is:—

1. The combination of an inflating means and a pressure gauge, and a coupling adapted to be connected to a pneumatic container, said coupling having valve-controlled means of communication between said gauge and the pneumatic container and between said inflating means and the pneumatic container, said coupling also having valve-controlled means for venting said pneumatic container.

2. A coupling having an opening for and a means for attaching an inflating means, a pressure gauge, and a pneumatic container thereto, and means for venting the pneumatic container, said opening for the pressure-gauge being valve-controlled.

3. A coupling having an opening for and a means for attaching an inflating means, a pressure gauge, and a pneumatic container thereto, and means for venting the pneumatic container, said openings for the pressure-gauge and inflating means being valve-controlled.

4. The combination of an inflating means, a pressure gauge, means for connecting said parts to a pneumatic tire valve or the like, and a manually-operable means operatively associated with the first mentioned means for relieving the pressure in such pneumatic tire.

5. The combination of an inflating means, a pressure gauge, means for connecting said parts to a pneumatic tire valve or the like, and a manually-operable means operatively associated with the first mentioned means for relieving the pressure in such pneumatic tire, said relief means comprising a manually-operable valve seating with the pressure.

6. A coupling having means for connection to a pneumatic tire valve, means for opening such valve, means for connection with a pressure gauge, and a manually-operable means for relieving the pressure in said tire.

7. A coupling having a passage for connection with a tire valve, means for opening such valve, a passage for connection with a gauge, a passage for connection with a pump or the like, and a relief passage, and a manually-operable valve contained in said relief passage.

8. An inflating device for tires comprising means for connecting said device with the interior of a pneumatic tire, an inflation passage-way adapted to be connected with a pump or reservoir for conducting compressed air to the tire through said means of connection, a pressure gauge, adapted to be placed in communication with the interior of said tire through said means of connection, and a manually operable valve adapted to vent air from the interior of the tire through said means of connection when there is an excess of air introduced into the tire, whereby air may be vented through said device from the tire without removing said device or the hose leading to said pump from connection with the tire, said means of connection with the tire, comprising a deflater adapted to contact with the stem of a valve in an ordinary valve casing, and open it to allow the pressure within the tire to act upon said gauge and to flow through said manually operable valve when opened to vent air from the tire.

In witness whereof, we have hereunto signed our names.

WILLIAM P. HAMMOND.
THEODORE A. HAMMOND.